(12) United States Patent
Ota et al.

(10) Patent No.: US 10,352,599 B2
(45) Date of Patent: Jul. 16, 2019

(54) EVAPORATOR

(71) Applicant: DENSO CORPORATION, Kariya, Aichi-pref. (JP)

(72) Inventors: Aun Ota, Okazaki (JP); Jun Abei, Obu (JP); Eiichi Torigoe, Anjo (JP); Toshiya Nagasawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 783 days.

(21) Appl. No.: 14/390,000

(22) PCT Filed: Apr. 1, 2013

(86) PCT No.: PCT/JP2013/059979
§ 371 (c)(1),
(2) Date: Oct. 1, 2014

(87) PCT Pub. No.: WO2013/151017
PCT Pub. Date: Oct. 10, 2013

(65) Prior Publication Data
US 2015/0068718 A1    Mar. 12, 2015

(30) Foreign Application Priority Data
Apr. 2, 2012    (JP) .................................. 2012-083969

(51) Int. Cl.
*F25B 39/02*    (2006.01)
*F28D 20/02*    (2006.01)
(Continued)

(52) U.S. Cl.
CPC ............ *F25B 39/028* (2013.01); *F25D 16/00* (2013.01); *F28D 1/05391* (2013.01);
(Continued)

(58) Field of Classification Search
CPC .... F28D 20/02; F28D 20/021; F28F 2215/08; F28F 2215/10; F28F 1/05391;
(Continued)

(56) References Cited

U.S. PATENT DOCUMENTS 3,769,767 A * 11/1973 Scott ....................... E04C 2/365
181/288
3,895,152 A *  7/1975 Carlson .................. B65D 90/06
428/116
(Continued)

FOREIGN PATENT DOCUMENTS

DE    102004035818 A1    3/2006
JP    H06129734 A         5/1994
(Continued)

OTHER PUBLICATIONS

Notice of Allowance dated Nov. 23, 2016 in corresponding Korean Patent Application No. 10-2014-7027950 with translation.
(Continued)

*Primary Examiner* — Devon Russell
(74) *Attorney, Agent, or Firm* — Harness, Dickey & Pierce, P.L.C.

(57) ABSTRACT

An evaporator is provided with a refrigerant pipe, a cold storage case which has inner fins mounted therein, and air-side fins. The evaporator is characterized in that the cold storage case is provided with: a filling opening for filling the cold storage case with a cold storage material; a first flow passage connecting to the filling opening and extending in the same direction as the direction of inflow of the cold storage material; and a second flow passage connecting to the first flow passage and extending in the direction intersecting the first flow passage.

16 Claims, 9 Drawing Sheets

(51) Int. Cl.
  *F28F 3/02*   (2006.01)
  *F28D 1/053*  (2006.01)
  *F28F 1/12*   (2006.01)
  *F25D 16/00*  (2006.01)
  *F28D 21/00*  (2006.01)
  *F28D 20/00*  (2006.01)

(52) U.S. Cl.
  CPC ............... *F28D 20/02* (2013.01); *F28F 1/12* (2013.01); *F28F 3/027* (2013.01); *F25B 2339/02* (2013.01); *F28D 2020/0008* (2013.01); *F28D 2021/0085* (2013.01); *Y02E 60/145* (2013.01)

(58) Field of Classification Search
  CPC . F28F 3/027; F28F 1/40; F25B 39/028; F25B 2339/02; F25D 16/00
  See application file for complete search history.

(56) References Cited

U.S. PATENT DOCUMENTS

| | | | | |
|---|---|---|---|---|
| 4,625,710 | A * | 12/1986 | Harada | F28D 20/02 126/619 |
| 6,964,178 | B2 * | 11/2005 | Aikawa | F25B 41/00 62/434 |
| 8,122,943 | B2 * | 2/2012 | Haller | F28D 1/0535 165/10 |
| 2004/0093889 | A1 * | 5/2004 | Bureau | B60H 1/00321 62/434 |
| 2007/0144714 | A1 * | 6/2007 | Yabe | F28D 1/0391 165/152 |
| 2008/0041087 | A1 * | 2/2008 | Muller | F28C 1/14 62/305 |
| 2009/0133860 | A1 * | 5/2009 | Harada | F28D 1/05366 165/151 |
| 2010/0065244 | A1 * | 3/2010 | Yokoyama | F28D 1/05383 165/10 |
| 2010/0307180 | A1 * | 12/2010 | Yamada | F28D 1/0333 62/285 |
| 2011/0154855 | A1 * | 6/2011 | Sasaki | F25B 39/022 62/524 |
| 2011/0179807 | A1 * | 7/2011 | Holloway | F24F 5/0017 62/3.62 |
| 2011/0239696 | A1 * | 10/2011 | Takagi | B60H 1/00335 62/524 |
| 2012/0048768 | A1 * | 3/2012 | Holloway | C09K 5/063 206/524.1 |
| 2012/0204597 | A1 * | 8/2012 | Karl | F25B 39/022 62/529 |

FOREIGN PATENT DOCUMENTS

| | | | |
|---|---|---|---|
| JP | 2009136630 | A | 6/2009 |
| JP | 2010030490 | A | 2/2010 |
| JP | 2010070071 | A | 4/2010 |
| JP | 2010091250 | A | 4/2010 |
| JP | 2010112670 | A | 5/2010 |
| JP | 2010126026 | A | 6/2010 |
| JP | 2010139201 | A | 6/2010 |
| JP | 2010149814 | A | 7/2010 |
| JP | 2011012947 | A | 1/2011 |
| JP | 2011149684 | A | 8/2011 |
| JP | 2011237160 | A | 11/2011 |
| JP | 2011242098 | A | 12/2011 |
| KR | 20070073175 | A | 7/2007 |
| WO | WO-2010074016 | A1 | 7/2010 |

OTHER PUBLICATIONS

Office Action dated Mar. 3, 2015 in corresponding JP Application No. 2012-083969 (with English translation).
Office Action dated Oct. 9, 2015 issued in the corresponding CN application No. 201380016043.2 in Chinese with English translation.
Office Action dated Sep. 4, 2015 issued in the corresponding KR application No. 10-2014-7027950 in Korean with English translation.
International Search Report (in Japanese with English Translation) for PCT/JP2013/059979, dated Jun. 25, 2013; ISA/JP.

* cited by examiner

CROSS-SECTION ALONG LINE C-C

EVAPORATOR

CROSS REFERENCE TO RELATED APPLICATIONS

This application is a U.S. National Phase Application under 35 U.S.C. 371 of International Application No. PCT/JP2013/059979 filed on Apr. 1, 2013 and published in Japanese as WO 2013/151017 A1 on Oct. 10, 2013. This application is based on and claims the benefit of priority from Japanese Patent Application No. 2012-083969 filed on Apr. 2, 2012. The entire disclosures of all the above applications are incorporated herein by reference.

TECHNICAL FIELD

The present invention relates to an evaporator which has cold storage cases in which a cold storage material is filled and inside of which inner fins are arranged sandwiched between refrigerant tubes.

BACKGROUND ART

In recent years, the number of vehicles with "idling stop" systems which turn the engines off when stopping for a stop traffic light or otherwise idling so as to improve the fuel economy has been increasing. In such an "idling stop" vehicle, sometimes the compressor of the air-conditioning system stops while the vehicle is at a stop (while the engine is stopped) and therefore the comfort of the air-conditioning is decreased. Further, to maintain the air-conditioned feeling, sometimes the engine ends up being restarted even while the vehicle is stopped. Therefore, in order to maintain the air-conditioned feeling even while the engine is stopped, a cold storage function evaporator which gives a cold storage function to the evaporator of a refrigeration cycle system has been proposed in the past. According to this cold storage function evaporator, it is possible to store the coldness during vehicle operation and use this cold air while the vehicle is stopped.

Such a cold storage function evaporator stores coldness in the cold storage material by solidification of the cold storage material in the cold storage cases during operation of the air-conditioner compressor. On the other hand, during idling stop, conversely the solid cold storage material melts while discharging cold air into sucked air so as to keep down the changes in temperature of the sucked air and maintain the air-conditioned feeling until the cold storage material completely melts. In the case of sandwiching the cold storage cases which are filled with the cold storage material between refrigerant tubes, time is taken for heat conduction from the outside wall surfaces of the cold storage cases to the cold storage material at the centers of the insides of the cases, so inner fins are often disposed in the insides of the cold storage cases for the purpose of shortening the heat conduction time.

When arranging inner fins inside the cold storage cases for the purpose of shortening the heat conduction time, the cold storage and cold discharge performance is improved, but as shown in PLT 1, the problem arose that the end parts of the inner fins, the peak parts of the corrugated shapes, etc. adhered to the inside surfaces of the cold storage cases so at the time of filling the cold storage material, the flow path of the flow of cold storage material could not be secured, so much time was taken for filling.

CITATIONS LIST

Patent Literature

PLT 1: Japanese Unexamined Patent Publication No. 2011-12947A

SUMMARY OF INVENTION

Technical Problem

The present invention, in consideration of the above problems, provides an evaporator which has cold storage cases in which inner fins are arranged and which is designed to enable the cold storage cases to be filled with a cold storage material in a short time.

Solution to Problem

To solve the above problems, the aspect of the invention of claim 1 provides an evaporator provided with refrigerant tubes (10), cold storage cases (2) which mount inner fins (3) inside them, and air side fins (20), wherein each cold storage case (2) is provided with a filling port (5) for filling a cold storage material, a first flow path (V) which is communicated with the filling port (5) and extends in the same direction as the direction of flow of the cold storage material, and a second flow path (H) which is communicated with the first flow path (V) and extends in a direction which intersects the first flow path (V). Due to this, at the time of filling, the flow path for the cold storage material which is filled from the filling port (5) to flow in the same direction as the direction of inflow down to the bottom part of the cold storage case is secured and the cold storage material from the filling port can be filled inside the cold storage case 2 in a short time.

To solve the above problems, the aspect of the invention of claim 9 provides an evaporator equipped with a cold storage function which is provided with refrigerant tubes (10), cold storage cases (2) which mount inner fins (3) inside them, and air side fins (20), wherein each cold storage case (2) is provided with a filling port (5) for filling a cold storage material and is provided with a vertical direction flow path (V) through which the cold storage material which was filled from the filling port (5) at the time of filling flows in the vertical direction straight down to a bottom part of the cold storage case and a horizontal direction flow path (H) through which the cold storage material moves in the horizontal direction. In this case as well, advantageous effects similar to the aspect of the invention of claim 1 are obtained.

Note, the above reference notations are examples which show correspondence with specific examples which are described in the later explained embodiments.

DESCRIPTION OF EMBODIMENTS

Figure 1:
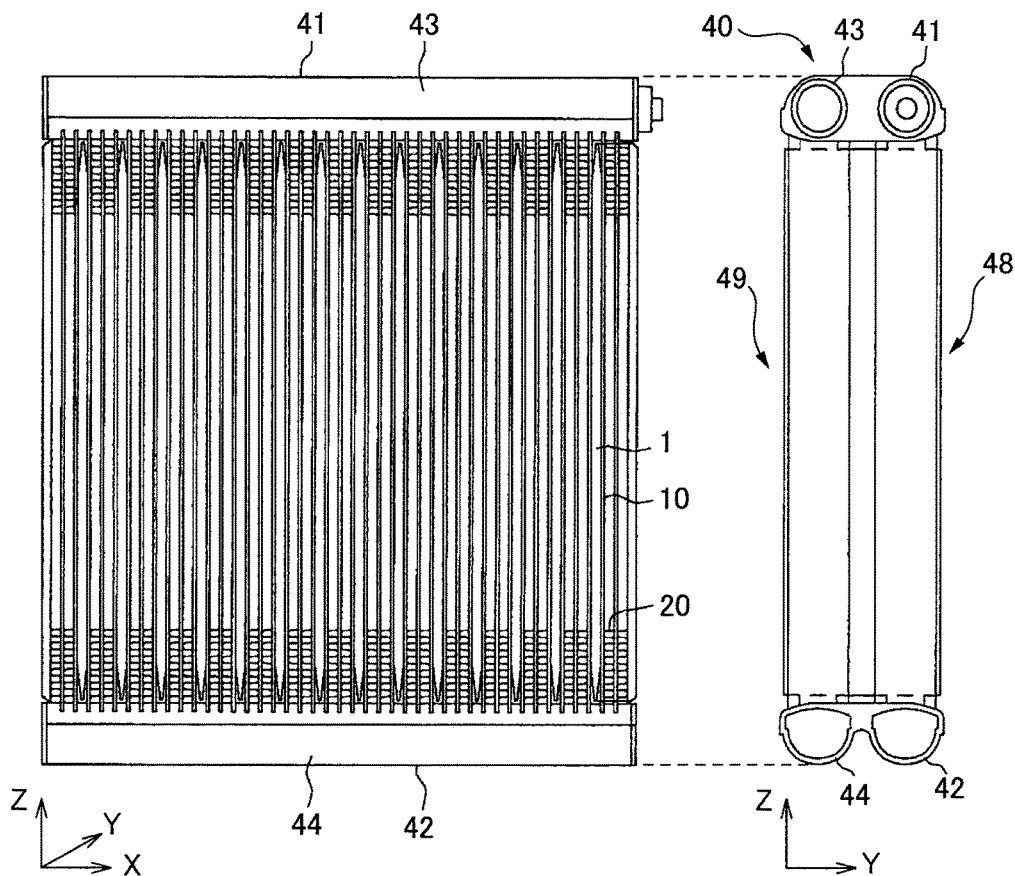
FIG. 1 is a schematic view which shows the overall configuration of an evaporator equipped with a cold storage function of first to eighth embodiments of the present invention.

Below, referring to the drawings, embodiments of the present invention will be explained. Parts of the same configuration in the different embodiments will be assigned the same reference notations and explanations thereof will be omitted.

(First Embodiment)

In the refrigeration cycle system of a vehicular air-conditioning system, there are a compressor, condenser, pressure reducer, and evaporator 40. The evaporator 40 has, as one example, a first heat exchanger 48 and a second heat exchanger 49 arranged in two layers. Further, the second heat exchanger 49 is arranged at an upstream side of the flow of air, while the first heat exchanger 48 is arranged at a downstream side of the flow of air. The present embodiment is not limited to such a two-layer arrangement. It may also be a single-layer structure and can be applied broadly to evaporators equipped with cold storage functions for vehicular use.

The refrigerant passage members comprise first to fourth headers 41 to 44 positioned forming sets and a plurality of refrigerant tubes 10 which connect the headers 41 to 44. The first header 41 and the second header 42 form a set and are arranged in parallel separated from each other by a predetermined distance. The third header 43 and the fourth header 44 also form a set and are arranged in parallel separated from each other by a predetermined distance. Between the first header 41 and the second header 42, a plurality of refrigerant tubes 10 are arranged at equal intervals. These refrigerant tubes 10 are communicated with the insides of the corresponding headers 41 and 42 at their end parts. These first header 41, second header 42, and the plurality of refrigerant tube 10 arranged between them form the first heat exchanger 48.

Between the third header 43 and the fourth header 44, a plurality of refrigerant tubes 10 are arranged at equal intervals. The refrigerant tubes 10 are communicated with the insides of the corresponding headers 43 and 44 at their end parts. These third header 43, fourth header 44, and the plurality of refrigerant tubes 10 which are arranged between them form the second heat exchanger 49.

The refrigerant tubes 10 are tubes which are formed in a flat shape and which form refrigerant passages inside them. The refrigerant tubes 10 are formed by pressing, punching, or other sheet working. The refrigerant tubes 10 can also be obtained by extrusion. A plurality of refrigerant passages therefore extend along the longitudinal directions (Z-axial direction of FIG. 1) of the refrigerant tubes 10 and open at the two ends of the refrigerant tubes 10. A plurality of refrigerant tubes 10 are arranged in rows. At each row, a plurality of refrigerant tubes 10 are arranged so that their flat surfaces face each other.

At the evaporator 40, air side fins 20 are arranged at each air passage which is defined between two adjoining refrigerant tubes 10. The air side fins 20 may be also arranged between the refrigerant tubes 10 and the cold storage members 1. The air side fins 20 are joined to the two adjoining refrigerant tubes 10 by a brazing material. The air side fins 20 are formed by bending thin aluminum or other metal sheets into corrugated shapes by about 3 to 4 mm pitches. The direction of air flow of the air side fins 20 is the Y-axial direction in FIG. 1.

Figure 2A:
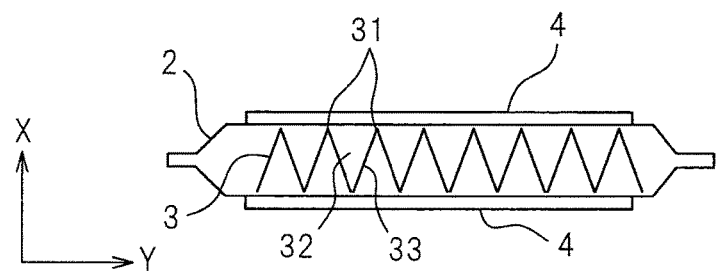
FIG. 2A is a plan cross-sectional view of first and second embodiments of the present invention.
Figure 2B:
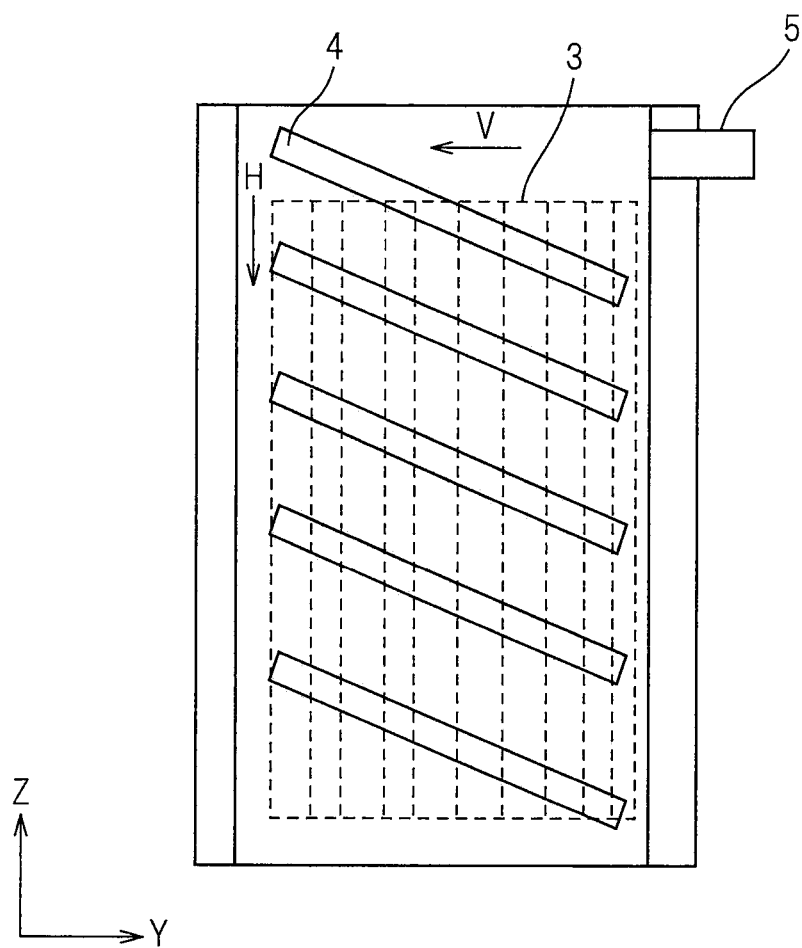
FIG. 2B is a front view of first and second embodiments of the present invention.

The evaporator 40 is an evaporator with a cold storage function which has a plurality of cold storage members 1. Each cold storage members 1 is formed from a cold storage case 2 which is formed into a flat tubular shape by aluminum or another metal and houses a cold storage material (paraffin-based etc.) inside. The cold storage member 1 has broad flat surfaces at the two surfaces which are respectively arranged in parallel with refrigerant tubes 10. At the cold storage case 2 at the sides joined with the refrigerant tubes 10, projecting parts 4 such as shown in FIG. 2B stick out. These are formed in slanted shapes so as to facilitate the discharge of condensed water or ice which is formed at the time of cold storage. At the top part of the cold storage case 2, a filling port 5 through which the cold storage material is made to flow to the inside of the cold storage case 2 is connected.

Such an evaporator equipped with a cold storage function stores cold by the cold storage material inside the cold storage cases 2 solidifying during operation of the air-conditioner compressor. During "idling stop", conversely the solid cold storage material is made to melt to cool the air which passes through the air passages. Due to this, up the cold storage material completely melts, temperature changes in the sucked air can be suppressed, and the air-conditioned feeling can be maintained.

In the case of the present embodiment where cold storage cases 2 which are filled with the cold storage material are sandwiched between the refrigerant tubes 10, the distance of heat movement from the surfaces of the cold storage cases to the cold storage material becomes close to ½ of the clearance between refrigerant tubes, so time is taken for cold storage. Therefore, in the present embodiment, for the purpose of shortening the distance of heat movement, inner fins 3 which are bent in a corrugated shape are attached inside the cold storage cases 2. When arranging inner fins 3 inside the cold storage cases 2, the cold storage and cold discharge performance is improved, but the inner fins 3 are brazed to the inside surfaces of the cold storage cases 2. In the regions in the cold storage cases 2 where the inner fins 3 are arranged, the inner fins 3 are used to define and form a plurality of narrow flow paths. Sub flow paths are formed between adjoining peak parts 31 and peak parts 31. For this reason, at the time of filling the cold storage material, the flow paths for flow of cold storage material cannot be secured, so time was taken for filling.

Figure 3:
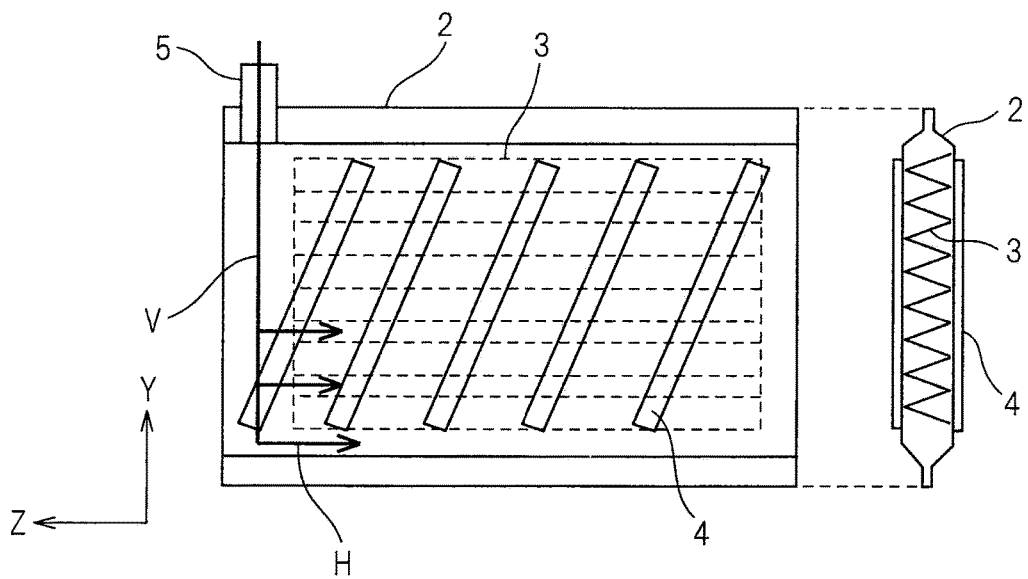
FIG. 3 is an explanatory view of first and second embodiments of the present invention at the time of filling a cold storage material.
Figure 4:
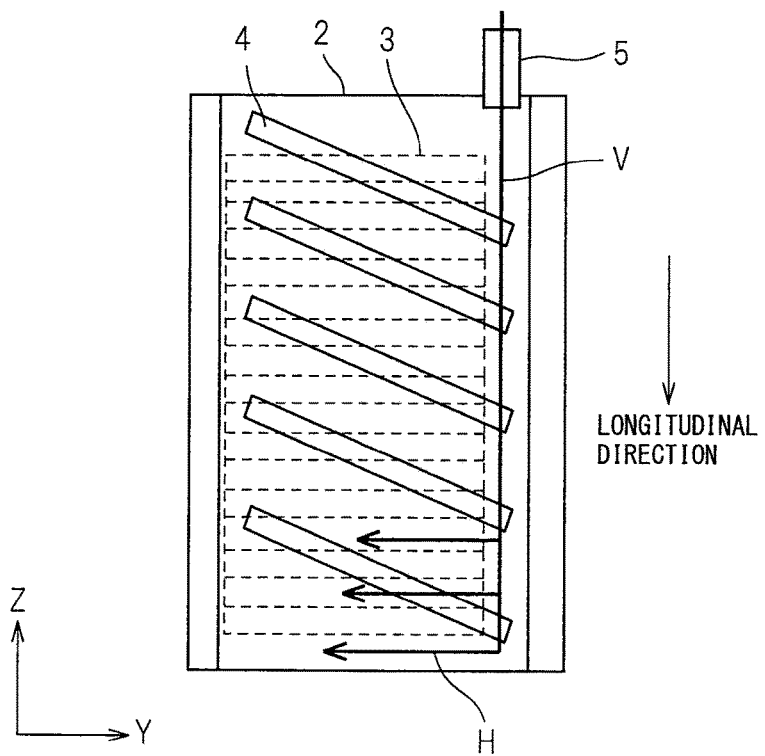
FIG. 4 is an explanatory view of first and third embodiments of the present invention.
Figure 5:
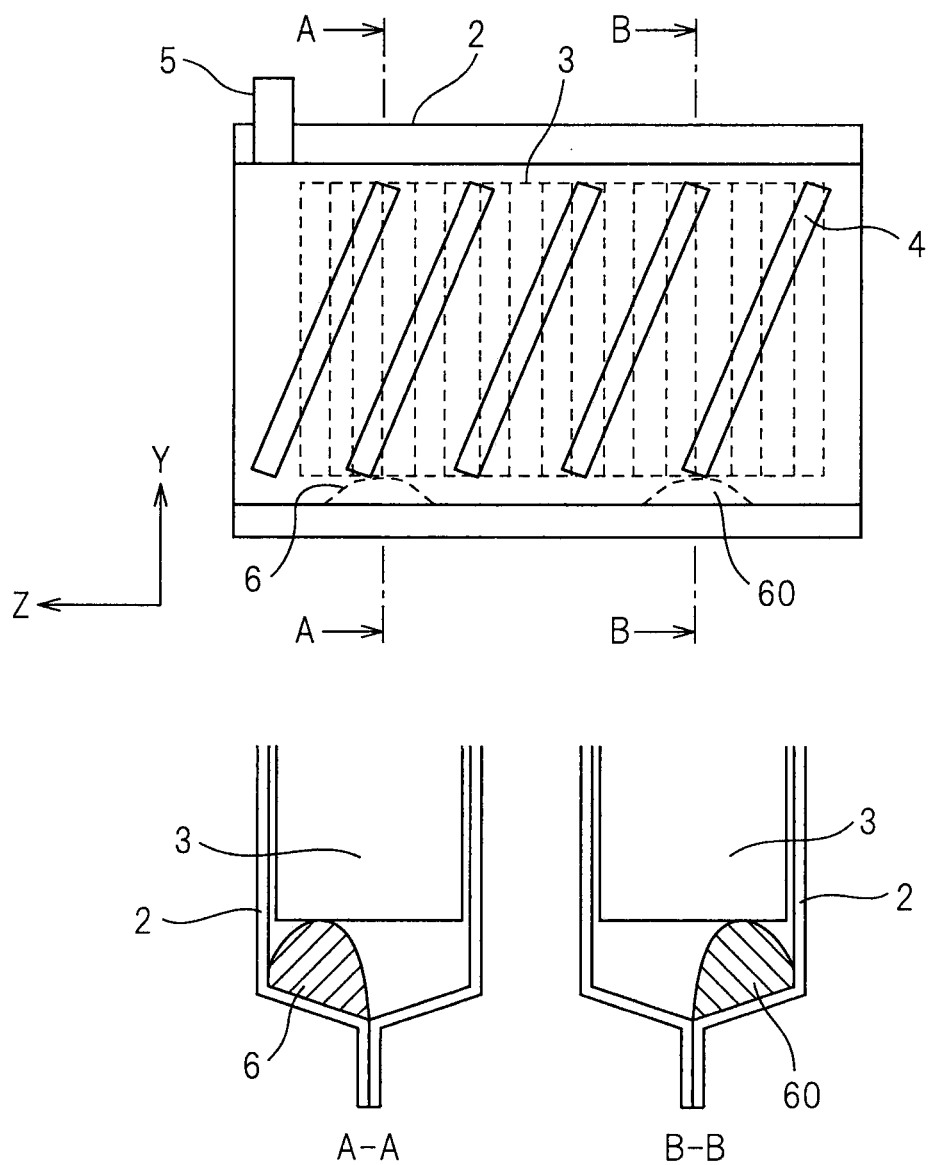
FIG. 5 is an explanatory view of first and fourth embodiments of the present invention.
Figure 6A:
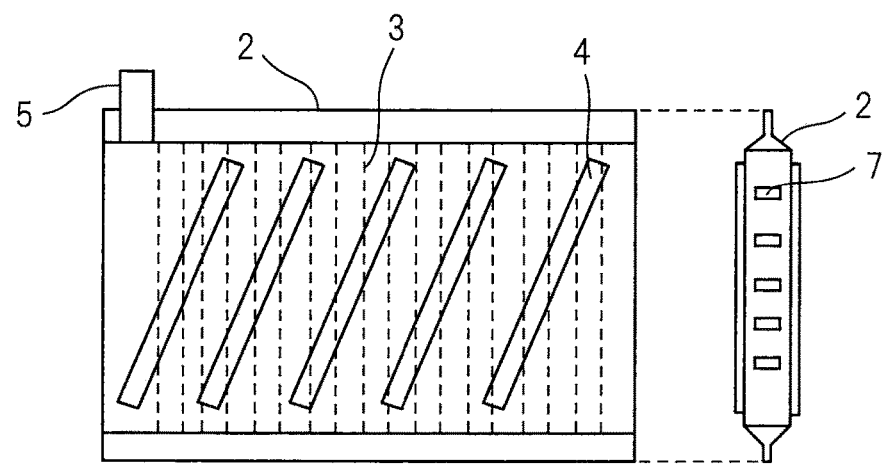
FIG. 6A is an explanatory view of a fifth embodiment of the present invention.
Figure 6B:
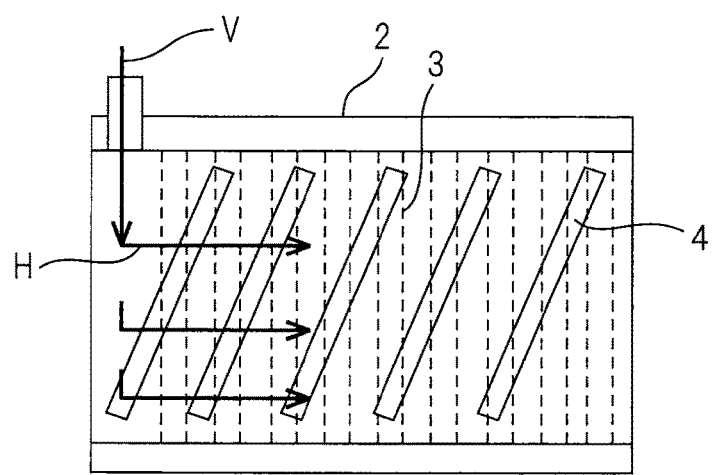
FIG. 6B is an explanatory view of the fifth embodiment of the present invention at the time of filling a cold storage material.

To solve this problem, there is provided a cold storage case 2 which mounts inner fins 3 at the inside. The cold storage case 2 is provided with a filling port 5 for filling a cold storage material, a first flow path V which communicates with the filling port 5 and extends straight in the same direction as the direction of flow of the cold storage material, and a second flow path H which communicates with the first flow path V and extends in a direction which intersects the first flow path V. The first flow path V is formed in a region in the cold storage case 2 where no inner fins 3 are arranged. The flow area of the first flow path V is larger than the flow area of the sub flow paths, and the flow resistance of the first flow path V is set smaller than the flow resistance of the sub flow paths of the inner fins 3. The second flow path H communicates with the end part of the first flow path V at the opposite side from the filling port 5 side and is formed to extend in a direction which intersects the first flow path V. In the case of FIG. 3 and FIG. 4, the second flow path H is the flow path which extends along the ridge direction of the peak parts 31 of the inner fins at the bottom part of the cold storage case 2. In the case of FIG. 5, the flow path which is formed at the bottom part of the cold storage case 2 corresponds to the second flow path H, but the second flow path H may also be other various flow paths. In the case of FIGS. 6A and 6B, the flow path which is formed running through the through holes 7 corresponds to the second flow path H. In the case of FIG. 4, the cold storage case 2 has a flat cross-sectional shape vertical to the longitudinal direction, and the direction of the first flow path V is the longitudinal direction of the cold storage case 2. The first flow path V communicates with the filling port 5 and extends straight in the same direction as the direction of flow of the cold storage material, so it is possible to make the cold storage material which flows in from the filling port 5 flow into the first flow path V with priority. After this, the cold storage material which flows into the first flow path V flows into the second flow path H which is formed at the cold storage case 2. As a result, it is possible to efficiently fill the cold storage material. In particular, when filling it, the first flow path V extends in a direction communicating with the filling port 5 in a straight line so that the cold storage material which is filled from the filling port 5 flows straight down to the bottom part of the cold storage case, the first flow path V is larger in flow area than the sub flow paths, and the first flow path V is smaller in flow resistance than the sub flow paths, so the cold storage material flows to the first flow path V with priority. When filling the cold storage material, the invention can be applied even if not a straight line in the strict sense so long as a range in which no flow resistance particularly occurs in the shape of the flow path.

The inner fins 3 may be arranged as shown in FIG. 3 so that the direction of advance of the corrugations becomes the width direction of the cold storage case 2 (in the figure, Y-axial direction) or may be arranged as shown in FIG. 5 so that the direction of advance of the corrugations becomes the longitudinal direction of the cold storage case 2 (in the figure, Z-axial direction).

Figure 7:
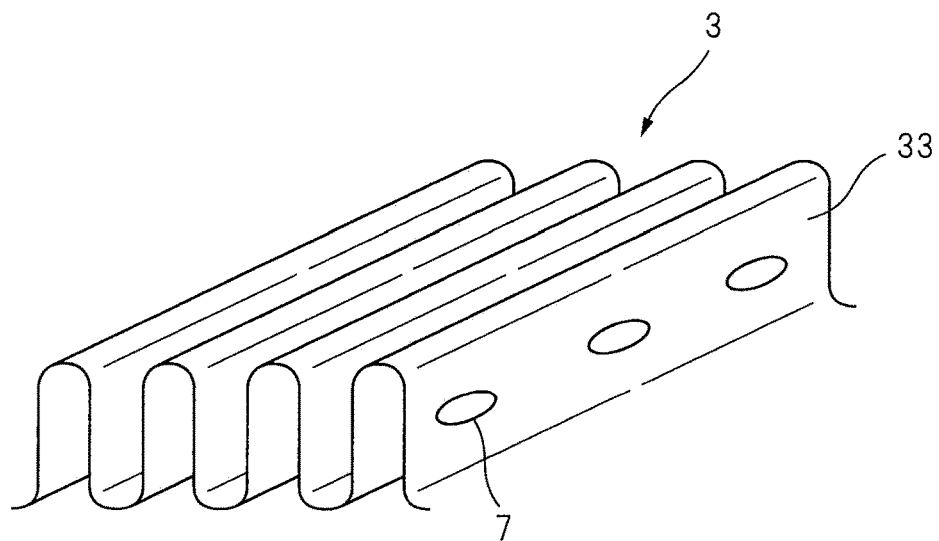
FIG. 7 is a perspective view of inner fins of the fifth embodiment of the present invention.
Figure 8:
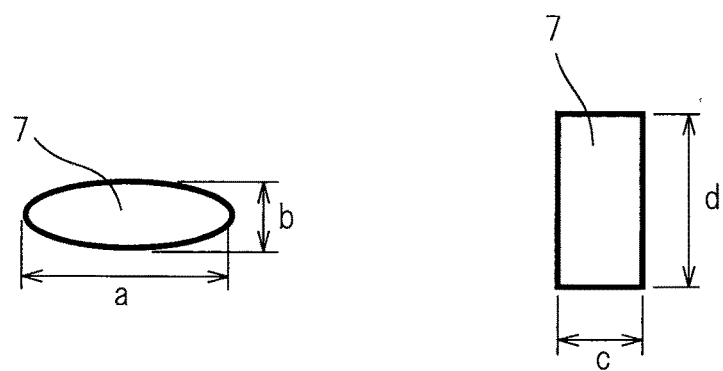
FIG. 8 shows examples of through holes which are provided in the inner fins of the fifth embodiment of the present invention.

As shown in FIGS. 6A, 6B, and 7, when the ridge direction of the peak parts 31 of the inner fins extends in the width direction of the cold storage case 2, the flat plate parts which form the peak parts 31 of the inner fins 3 are provided with a plurality of through holes 7. The cold storage material which flows into the first flow path V can be made to pass through these through holes 7.

(Second Embodiment)

The second embodiment is an embodiment in which the first flow path V is a vertical direction flow path where the cold storage material which was filled from the filling port flows in the vertical direction straight down to the bottom part of the cold storage case, and where the second flow path H is a horizontal direction flow path where the cold storage material moves in the horizontal direction. The cold storage case 2 is provided with a filling port 5 for filling the cold storage material and is provided with, at the inside, a vertical direction flow path V through which the cold storage material which was filled from the filling port 5 at the time of filling flows in the vertical direction straight down to the bottom part of the cold storage case, and a horizontal direction flow path H where the cold storage material moves in the horizontal direction. Normally, the longitudinal direction of the cold storage case 2, as seen in FIG. 2B, is the Z-axial direction. Therefore, at the time of filling, as shown in FIG. 3, the case is turned 90 degrees, then the cold storage material is made to face the vertical direction and is filled so as to drop down by gravity. Of course, it is also possible, like in FIG. 4 of the later explained third embodiment, to fill it while the case is standing in the longitudinal direction. In the second embodiment, as shown in FIG. 3, at the time of filling, that is, after turning the case 90 degrees in FIG. 2B, a vertical direction flow path V where the cold storage material which was filled from the filling port 5 flows in the vertical direction straight down to the bottom part of the cold storage case is provided. The vertical direction flow path V serves as a buffer to accumulate the cold storage material once then allow it to flow along the peak shapes of the inner fins 3 in the horizontal direction. Due to this, compared with the past, it is possible to efficiently finish the filling in about half of the filling time.

The horizontal direction flow path H is formed by the valley parts 32 between the adjoining peak parts 31 and peak parts 31 of the inner fins 3 which are formed by being bent to a corrugated shape so that the filled cold storage material flows in the horizontal direction. By arranging the line which connects the vertices of the peak parts 31 of the inner fins 3 (below, referred to as the "crest direction") parallel to the longitudinal direction (Z-axial direction) of the cold storage case 2, at the time of filling, the cold storage material flows along the peak shapes of the inner fins 3. In the second embodiment, the direction of filling the cold storage material of the filling port 5 is set to the air flow direction (Y-axial direction) of the air side fins. In this case, it is possible to shorten the distance between the headers 41, 43 and 42, 44 (Z-axial direction). The direction of flow of the filling port 5 (inflow port) of the cold storage case 2 and the crest direction of the inner fins 3 are at right angles. Note, preferably a certain clearance is provided between the end parts of the inner fins 3 and the filling port 5.

As explained above, by making the direction of the filling port 5 and the vertical direction flow path V which is connected with this and the crest direction of the inner fins 3 form right angles, the cold storage material from the filling port can be filled inside the cold storage case 2 in a short time. Note that, the crest direction of the inner fins 3 is not necessarily limited to right angles and may also be slanted.

(Third Embodiment)

In the third embodiment, as shown in FIG. 4, vertical direction flow paths V are provided along the Z-axial direction so as to enable filling vertically in the longitudinal direction. At the time of filling, the cold storage material which is filled from the filling port 5 passes through the vertical direction flow path V and flows in the vertical direction straight until the bottom part of the cold storage case. The horizontal direction flow path H (Y-axial direction) is formed by the valleys 32 between adjoining peak shapes 31 and peak shapes 31 of the inner fins 3 which are bent in a corrugated shape whereby the filled cold storage material flows in the horizontal direction. In the present embodiment, similar effects as the second embodiment are obtained.

(Fourth Embodiment)

Referring to FIG. 5, a fourth embodiment will be explained. In the fourth embodiment, as shown in FIG. 5, a space is formed between the end parts of the inner fins 3 (in FIG. 5, bottom end parts) and the bottom part of the cold storage case 2, and the cold storage material is made able to flow along the bottom part of the cold storage case 2 in the horizontal direction by providing at least single flow path holding projections 6, 60 at the bottom part of the cold storage case 2. Here, the "bottom part of the cold storage case" is the side surface of the case which becomes the bottom in the vertical direction at the time of filling. The flow path holding projections 6, 60 do not necessarily have to be two. The inner fins 3 are fastened to the cold storage case 2 by brazing or other fastening means, so one is also possible or a suitable number may be set. If the number of peaks of the inner fins 3 is large and the fins are long in the longitudinal direction, a plurality of flow path holding projections may be provided. The width of the flow path holding projections in the Z-axial direction of FIG. 5 (longitudinal side direction) is greater than a size of the inner fin pitch fp of the mounted fins. Further, if placing the flow path holding projections 6 at the bottom part of the cold storage case 2 the furthest from the filling port 5, the filled cold storage material is not obstructed from flowing in the horizontal direction.

As seen in the cross-sections A-A and B-B of FIG. 5, the flow path holding projections 6, 60 are set at just single sides in the width direction so as not to close the horizontal direction flow path H. In the case of the fourth embodiment, even when the crest direction of the inner fins 3 is parallel to the vertical direction flow path V, a horizontal direction flow path H can be secured. Of course, as shown in FIG. 3, even the case where the vertical direction flow path V and the crest direction of the inner fins 3 are perpendicular is included in the fourth embodiment.

(Fifth Embodiment)

Referring to FIGS. 6A and 6B and FIGS. 7 to 10, fifth and sixth embodiments will be explained. In the case of the fifth embodiment, the crest direction of the inner fins 3 is parallel to the vertical direction flow path V. In this case, since blocked in the crest direction of the inner fins 3, the horizontal direction flow path H cannot be secured. In such a case, as seen in FIG. 7, the flat plate parts 33 of the inner fins are provided with pluralities of through holes 7 so that, as shown in FIG. 6B, the filled cold storage material can be moved from the vertical direction flow path V to the horizontal direction flow path H. In the present embodiment, similar effects as the second embodiment are obtained.

(Sixth Embodiment)

Figure 9:
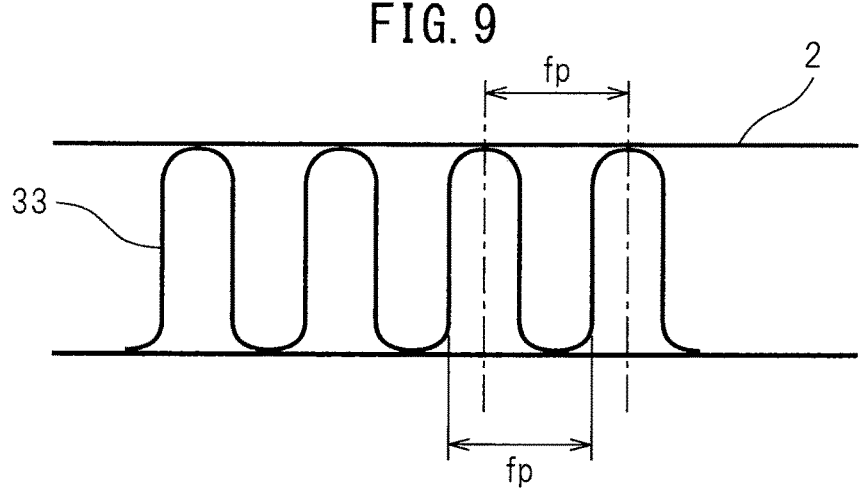
FIG. 9 is an explanatory view of a fin pitch of the inner fins of the fifth embodiment of the present invention.

The through holes 7 are not limited to circles or squares. As one example, ovals or rectangles such as in FIG. 8 may be mentioned. The minimum values of size in the case of holes in this case are "b" and "c". When providing the inner fins 3 with holes enabling cold storage material to pass, the fear arises of a detrimental effect on the heat conduction performance. However, if the minimum values "b" and "c" of the size of the through holes are half of the inner fin pitch fp or less, there is no detrimental effect on the heat conduction performance. The "inner fin pitch fp" means the distance between adjoining peak parts 31 and peak parts 31 of the inner fins which are bent in a corrugated shape. As shown in FIG. 9, if the flat plate parts 33 of the inner fins are set in parallel, the distance between the flat plate parts 33 of the repeating units may be made the inner fin pitch fp.

Figure 10:
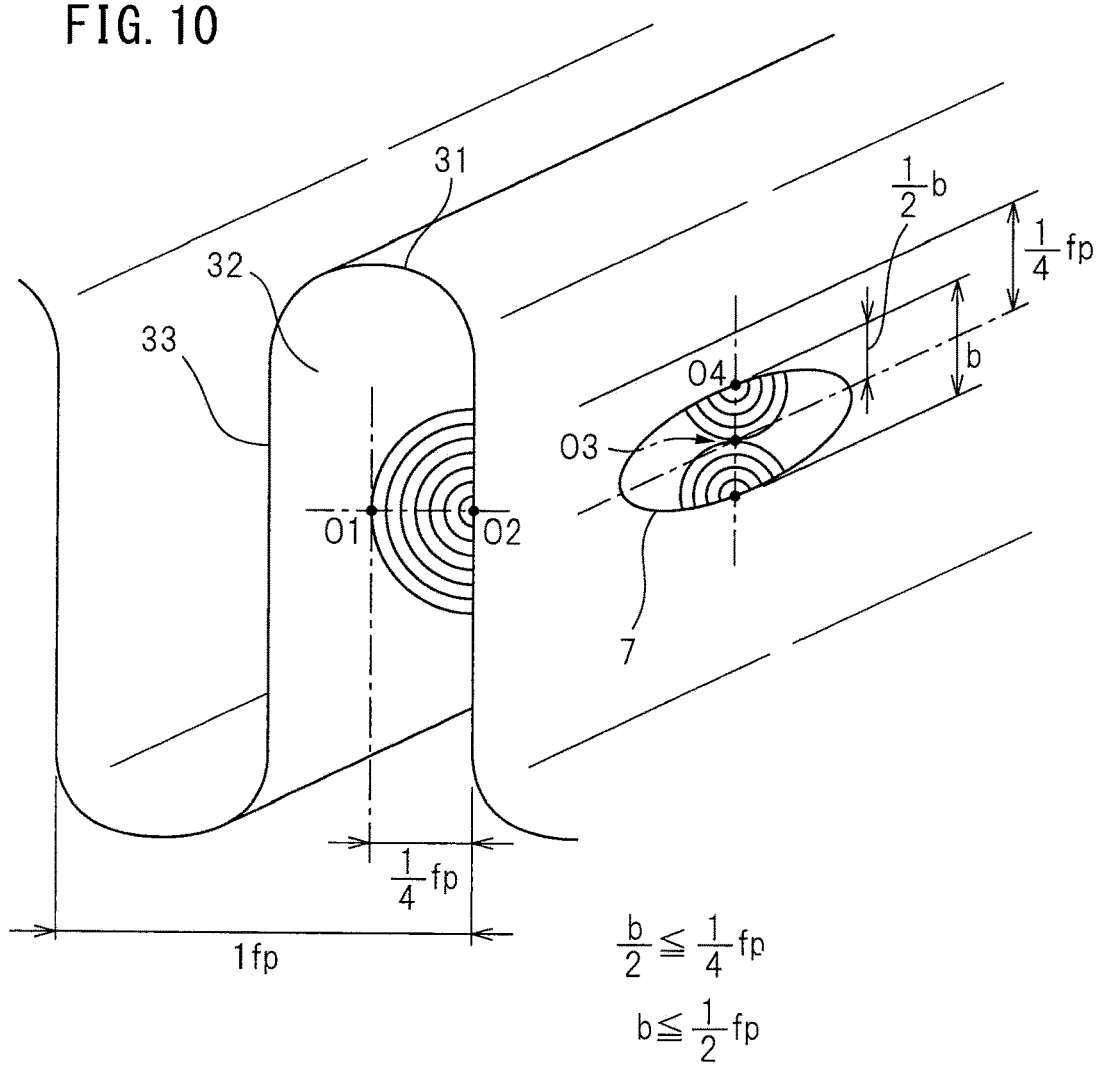
FIG. 10 is an explanatory view of heat conduction from inner fins to the cold storage material of a sixth embodiment of the present invention.

The reason why there is no detrimental effect at all on the heat conduction performance if half or less of the inner fin pitch fp will be explained below using FIG. 10. The flow of heat conduction at the time of filling is from the cold storage cases 2 through the inner fins 3 to the cold storage material. In the cold storage material, the center parts O1 of the valley parts 32 of the inner fins 3 (on centerlines of valley parts) become the locations where heat is finally conducted from the flat plate parts 33 of the left and right inner fins of FIG. 10. If the heat conduction speed is α, if comparing the time T of heat conduction over the heat conduction distance (¼)fp from the point O2 to the point O1 and time t of heat conduction over the heat conduction distance b/2 through the through holes 7 from the point O4 to the point O3 and T≥t, there is no detrimental effect on the heat conduction performance at all. The reason is that when conducting heat from point O2 to point O1, heat is already finishing being conducted from the point O4 to the point O3. If T=(¼×fp)/α and t=(b/2)/α, the result becomes b≤(½)fp. Therefore, it is learned that if the minimum values "b" and "c" of the size of the through holes 7 are half of the inner fin pitch fp or less, there is no detrimental effect on the heat conduction performance.

By making the size of the through holes 7 (½)fp or less, the through holes have no detrimental effect on the filling time, the through holes 7 enable a flow path for the flow of filling of the cold storage material to be secured, and the filling time of the cold storage material can be shortened.

(Seventh Embodiment)

Figure 11A:
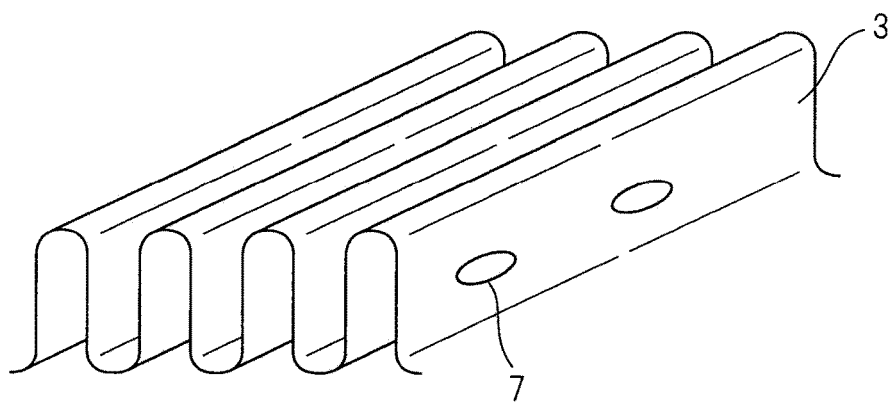
FIG. 11A is a perspective view of inner fins of a seventh embodiment of the present invention.
Figure 11B:
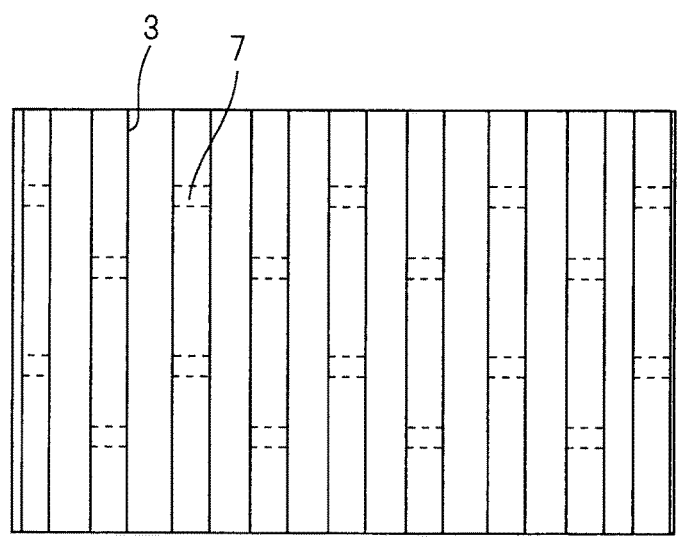
FIG. 11B is a front view of the seventh embodiment of the present invention.

In the case of the seventh embodiment, as seen in FIG. 11B, the flat plate parts 33 of the inner fins are provided with pluralities of through holes 7 zigzag at the flat plate parts of the different rows. If doing this, in the same way as the fifth embodiment, the filled cold storage material can move from the vertical direction flow path V to the horizontal direction flow path H. For the size of the through holes 7, the same formula stands as in the sixth embodiment. The rest is similar to the fifth embodiment in both configuration and advantageous effects.

(Eighth Embodiment)

Figure 12A:
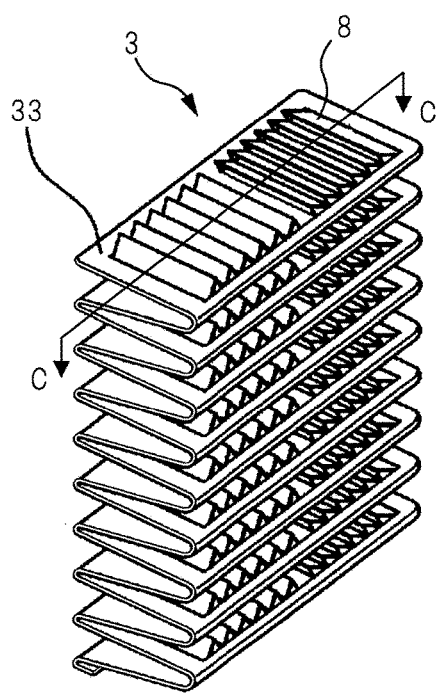
FIG. 12A is a perspective view of inner fins of an eighth embodiment of the present invention.
Figure 12B:
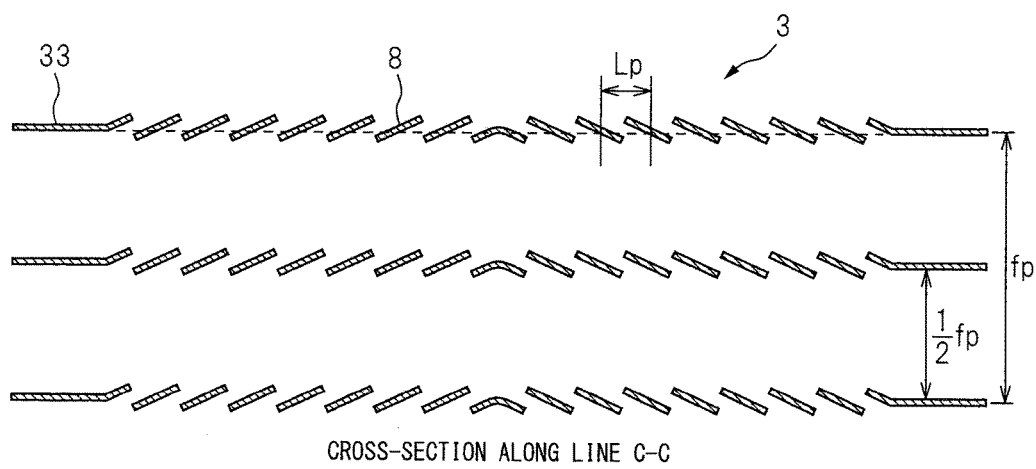
FIG. 12B is a cross-sectional view along the line C-C in FIG. 12A.

In the case of the eighth embodiment, as seen in FIG. 12A and FIG. 12B (cross-sectional view along the line C-C), the flat plate parts 33 of the inner fins 3 which are arranged inside the cold storage cases 2 are formed with louvers 8 which are cut and raised from the flat plate parts 33. The louvers 8 have a louver pitch Lp (see FIG. 12B) of ½fp or less (Lp≤½fp). Note, the "louver pitch Lp" is the distance between centers of adjoining louvers in the same plane as the flat plate parts 33. In the case of the eighth embodiment, the louver pitch Lp of the louvers 8 corresponds to the minimum value of the through holes 7 in the sixth embodiment. The rest is similar to the other embodiments in both configuration and advantageous effects.

REFERENCE SIGNS LIST 2 cold storage case
3 inner fins
5 filling port
10 refrigerant tube
20 air side fins

What is claimed is:

1. An evaporator provided with refrigerant tubes, cold storage cases in which a cold storage material is filled and inner fins are disposed, and air side fins, wherein
each cold storage case is provided with
a filling port for filling a cold storage material,
a first flow path which is formed in a region in the cold storage case where no inner fins are arranged and communicated with said filling port and extends in the same direction as the direction of flow of said cold storage material filled from said filling port,
a second flow path which is communicated with said first flow path and extends in a direction which intersects said first flow path, and
a ridge direction of peak parts of the inner fins which are formed by being bent to a corrugated shape extends in a width direction of the cold storage case, and flat plate parts which connect a peak part of the inner fin with an other peak part form the peak parts of the inner fins, and are provided with a plurality of through ports which are formed by rectangular louvers which are cut and raised from the flat plate parts, a louver pitch is identical to or lower than half of an inner fin pitch.

2. The evaporator according to claim 1, wherein sub flow paths are formed between adjoining peak parts, and a flow path resistance of said first flow path becomes smaller than a flow path resistance of said sub flow paths.

3. The evaporator according to claim 1, wherein sub flow paths are formed between adjoining peak parts, and a flow area of said first flow path is larger than a flow area of said sub flow paths.

4. The evaporator according to claim 1, wherein said cold storage case has a flat cross-sectional shape vertical to the longitudinal direction and wherein the direction of said first flow path is said longitudinal direction of said cold storage case.

5. The evaporator according to claim 2,
wherein said first flow path is a vertical direction flow path through which the cold storage material filled from said filling port, flows in the vertical direction straight down to the bottom part of the cold storage case, and
said second flow path is a horizontal direction flow path through which the cold storage material moves in the horizontal direction.

6. The evaporator according to claim 5, wherein said horizontal direction flow path is sub small flow paths.

7. The evaporator according to claim 6, wherein
the sub small flow paths include valleys between adjoining peak parts and peak parts of the inner fins that are bent in corrugated shapes, and
the filled cold storage material flows in the horizontal direction.

8. The evaporator according to claim 6, wherein said sub flow paths are formed by the plurality of through ports which are provided at the flat plate parts of said inner fins.

9. The evaporator with a cold storage function according to claim 1,
wherein a space is formed between end parts of said inner fins and the bottom part of the cold storage case at the time of filling and
at least one flow path holding projection designed to enable said cold storage material to move along the bottom part of said cold storage case in the horizontal direction, is provided at the bottom part of said cold storage case.

10. The evaporator with a cold storage function according to claim 1, wherein a direction of filling said cold storage material of said filling port is an air flow direction of said air side fins.

11. An evaporator with a cold storage function which is provided with refrigerant tubes, cold storage cases in which a cold storage material is filled and inner fins are disposed, and air side fins, wherein
each cold storage case is provided with
a filling port for filling a cold storage material
a vertical direction flow path which is formed in a region in the cold storage cases where no inner fins are arranged and through which the cold storage material filled from said filling port, flows in the vertical direction straight down to the bottom part of the cold storage case during filling,
a horizontal direction flow path through which the cold storage material moves in the horizontal direction, and
a ridge direction of peak parts of the inner fins which are formed by being bent to a corrugated shape extends in a width direction of the cold storage case, and flat plate parts which connect a peak part of an inner fin with an other peak part form the peak parts of the inner fins, and are provided with a plurality of through ports which are formed by rectangular louvers which are cut and raised from the flat plate parts, a louver pitch is identical to or lower than half of an inner fin pitch.

12. The evaporator with a cold storage function according to claim 11, wherein the horizontal direction flow path is provided by the inner fins.

13. The evaporator with a cold storage function according to claim 12, wherein said horizontal direction flow path is formed by the valleys between adjoining peak parts and peak parts of the inner fins which are bent in corrugated shapes, and the filled cold storage material flows in the horizontal direction.

14. The evaporator with a cold storage function according to claim 12, wherein said horizontal direction flow path is formed by the plurality of through ports which are provided at the flat plate parts of the inner fins.

15. The evaporator with a cold storage function according to claim 11,
wherein a space is formed between end parts of said inner fins and the bottom part of the cold storage case at the time of filling and
at least one flow path holding projection designed to enable said cold storage material to move along the bottom part of said cold storage case in the horizontal direction, is provided at the bottom part of said cold storage case.

16. The evaporator with a cold storage function according to claim 11, wherein a direction of filling said cold storage material of said filling port is an air flow direction of said air side fins.

* * * * *